United States Patent
O'Connor et al.

(10) Patent No.: US 11,118,555 B2
(45) Date of Patent: Sep. 14, 2021

(54) APPARATUS AND SYSTEM FOR DUAL IGNITION SOURCES FOR A VEHICLE

(71) Applicant: Cummins Inc., Columbus, IN (US)

(72) Inventors: Daniel J. O'Connor, Columbus, IN (US); Robin J. Bremmer, Columbus, IN (US); J. Steven Kolhouse, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/902,537

(22) Filed: Jun. 16, 2020

(65) Prior Publication Data

US 2020/0309083 A1 Oct. 1, 2020

Related U.S. Application Data

(63) Continuation of application No. PCT/US2017/067561, filed on Dec. 20, 2017.

(51) Int. Cl.

| | |
|---|---|
| F02B 19/10 | (2006.01) |
| F02B 23/08 | (2006.01) |
| F02P 11/00 | (2006.01) |
| F02P 15/08 | (2006.01) |
| F02P 5/152 | (2006.01) |
| F02B 1/06 | (2006.01) |
| F02B 19/12 | (2006.01) |

(Continued)

(52) U.S. Cl.
CPC ............... F02P 5/1521 (2013.01); F02B 1/06 (2013.01); F02B 19/1061 (2013.01);
(Continued)

(58) Field of Classification Search
CPC ............... F02B 19/10161; F02B 19/12; F02B 2023/085; F02B 19/1061; F02P 11/00;
(Continued)

(56) References Cited

U.S. PATENT DOCUMENTS 2,184,357 A * 12/1939 Mallory ............. F02B 19/1004
123/275
3,945,365 A * 3/1976 Regueiro ................ F02F 1/242
123/265

(Continued)

FOREIGN PATENT DOCUMENTS

| JP | 4193535 B2 | 3/2003 |
|---|---|---|
| JP | 2016089747 A1 | 5/2016 |

OTHER PUBLICATIONS

International Preliminary Report on Patentability; International Searching Authority; International Application No. PCT/US2017/067561; dated Jul. 2, 2020; 8 pages.

(Continued)

*Primary Examiner* — Erick R Solis
(74) *Attorney, Agent, or Firm* — Taft Stettinius & Hollister LLP (57) ABSTRACT

Apparatuses, methods, and systems for igniting fuel for an internal combustion engine, an ignition system include a first ignition device associated with a pre-combustion chamber of a cylinder and a second ignition device associated with a main combustion chamber of the cylinder. An engine control unit is operably connected to both the engine and the ignition system to ignite fuel for the cylinder with the first ignition device independently of igniting fuel with the second ignition device. The engine control unit determines an occurrence of a combustion condition and in response thereto (i) ignites fuel for combustion with both the first and the second ignition devices or (ii) ignites fuel for combustion only with the second ignition device. The engine control unit determines a second combustion condition and in response thereto ignites fuel only with the first ignition device.

20 Claims, 3 Drawing Sheets

(51) Int. Cl.
*F02P 5/15* (2006.01)
*F02P 11/06* (2006.01)
*F02P 17/12* (2006.01)
*F02P 15/00* (2006.01)

(52) U.S. Cl.
CPC .......... *F02B 19/12* (2013.01); *F02P 5/1506* (2013.01); *F02P 11/06* (2013.01); *F02P 15/008* (2013.01); *F02P 17/12* (2013.01); *F02B 2023/085* (2013.01); *F02P 2017/128* (2013.01)

(58) Field of Classification Search
CPC .......... F02P 11/06; F02P 15/008; F02P 15/02; F02P 15/08
USPC ................. 123/260, 287, 636, 638, 640; 73/114.02–114.12, 114.62, 114.68
See application file for complete search history.

(56) References Cited

U.S. PATENT DOCUMENTS

| | | | |
|---|---|---|---|
| 4,078,533 A * | 3/1978 | Nohira | F02B 19/12 123/260 |
| 5,465,695 A * | 11/1995 | Yamamoto | F02F 1/4214 123/256 |
| 6,055,954 A * | 5/2000 | Takada | F02B 19/16 123/257 |
| 8,006,666 B2 * | 8/2011 | Ashida | F02B 19/12 123/275 |
| 10,612,454 B2 * | 4/2020 | Bedogni | F02P 15/02 |
| 2007/0215102 A1 | 9/2007 | Russell et al. | |
| 2007/0221164 A1 | 9/2007 | Ashida et al. | |
| 2014/0209057 A1 * | 7/2014 | Pouring | F02B 19/1023 123/257 |
| 2019/0360385 A1 * | 11/2019 | Kulzer | F02B 23/104 |

OTHER PUBLICATIONS

International Search Report; International Searching Authority; International Application No. PCT/US2017/067561; dated Mar. 9, 2018; 2 pages.

Written Opinion of the International Searching Authority; International Searching Authority; International Application No. PCT/US2017/067561; dated Mar. 9, 2018; 7 pages.

\* cited by examiner

FIG. 5

APPARATUS AND SYSTEM FOR DUAL IGNITION SOURCES FOR A VEHICLE

CROSS-REFERENCE TO RELATED APPLICATION

The present application is a continuation of International Patent Application No. PCT/US17/67561 filed on Dec. 20, 2017, which is incorporated herein by reference.

BACKGROUND

The present disclosure generally relates to ignition of internal combustion engines, and more particularly, but not exclusively to control of dual ignition sources under certain conditions.

Pre-combustion chamber devices in internal combustion engines reduce engine emissions and can improve performance. However, there are many conditions that can impede operation of an internal combustion engine. One such condition includes unreliable ignition of fuel in a pre-combustion chamber. Unreliable ignition of fuel can occur for many reasons such as cold start of the engine, engine knock, and a fuel combustion mixture that is too lean. Thus, there remains a significant unmet need for the unique apparatuses, methods, systems and techniques disclosed herein.

SUMMARY OF THE DISCLOSURE

Unique apparatuses, methods, and systems are disclosed for igniting fuel in response to an occurrence of either a first combustion condition or a second combustion condition. The system includes an internal combustion engine, an ignition system including a first ignition device associated with a pre-combustion chamber of a cylinder and a second ignition device associated with a main combustion chamber of the cylinder, and an engine control unit operably connected to both the engine and the ignition system wherein the engine control unit can ignite fuel for the cylinder with the first ignition device independently of igniting fuel with the second ignition device. The engine control unit determines an occurrence of a first combustion condition and in response thereto (i) ignites fuel for combustion with both the first and the second ignition devices or (ii) ignites fuel for combustion only with the second ignition device. The engine control unit determines a second combustion condition and in response thereto ignites fuel only with the first ignition device.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
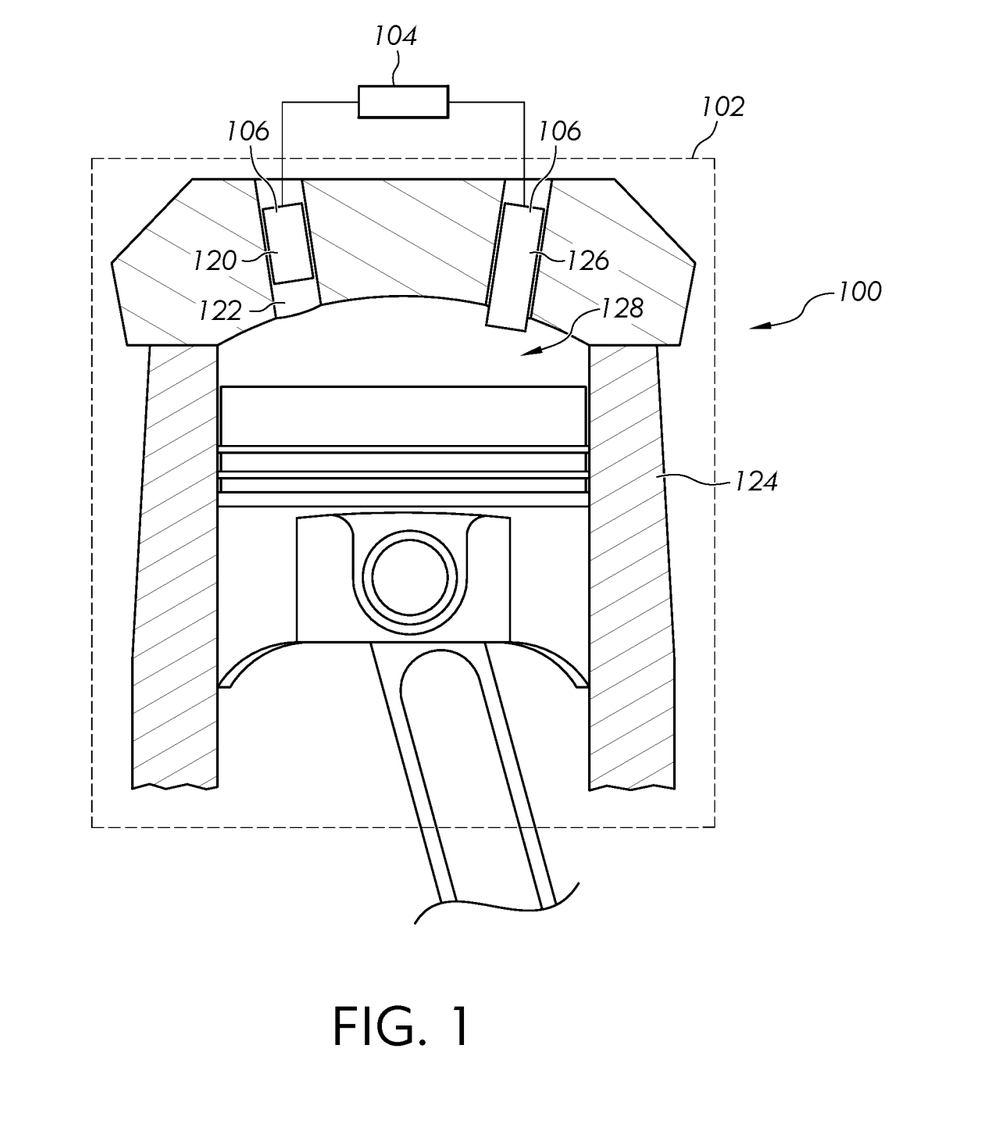
FIG. 1 is a schematic illustration of a vehicle system.

Referring to FIG. 1, is a schematic representation of a vehicle system 100. As shown, the vehicle system 100 includes an engine 102, an engine control unit 104, and an ignition system 106. The ignition system 106 includes a first ignition device 120 for igniting fuel in a pre-combustion chamber 122 of a cylinder 124. The ignition system 106 also includes a second ignition device 126 for igniting fuel in a main combustion chamber 128 of the cylinder 124. It shall be appreciated that the illustrated configuration and components of the vehicle system 100 are but one example, and that the disclosure contemplates that a variety of different vehicle systems 100 and associated components may be utilized.

A variety of engines may be used, such as, for example, internal combustion engines for engine 102. Operation of the engine 102 may cause operation of the ignition system 106. The engine control unit 104, which may be configured to control various operational aspects of vehicle system 100, may be implemented in a number of ways. The engine control unit 104 may execute operating logic that defines various control, management, and/or regulation functions. The operating logic may be in the form of one or more microcontroller or microprocessor routines stored in a non-transitory memory, dedicated hardware, such as a hardwired state machine, analog calculating machine, various types of programming instructions, and/or other forms as would occur to those skilled in the art.

Additionally, the engine control unit 104 may be provided as a single component, or a collection of operatively coupled components, and may comprise digital circuitry, analog circuitry, or a hybrid combination of both of these types. When of a multi-component form, the engine control unit 104 may have one or more components remotely located relative to the others in a distributed arrangement. The engine control unit 104 can include multiple processing units arranged to operate independently, in a pipeline processing arrangement, in a parallel processing arrangement, or the like. In one embodiment, the engine control unit 104 includes several programmable microprocessing units of a solid-state, integrated circuit type that are distributed throughout the vehicle system 100 that each include one or more processing units and non-transitory memory. For the depicted embodiment, the engine control unit 104 includes a computer network interface to facilitate communications using standard Controller Area Network (CAN) communications or the like among various system control units. It should be appreciated that the depicted modules or other organizational units of the engine control unit 104 refers to certain operating logic performing indicated operations that may be implemented in a physically separate controller of the engine control unit 104 and/or may be virtually implemented in the same controller.

The description herein including modules and/or organizational units emphasizes the structural independence of the aspects of the engine control unit 104, and illustrates one grouping of operations and responsibilities of the engine control unit 104. Other groupings that execute similar overall operations are understood within the scope of the present application. Modules and/or organizational units may be implemented in hardware and/or as computer instructions on a non-transient computer readable storage medium, and may be distributed across various hardware or computer based components.

Example and non-limiting implementation elements of modules and/or organizational units of the engine control unit 104 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The engine control unit 104 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

As shown in FIG. 1, the engine control unit 104 is operably connected to a variety of components of the vehicle system 100, including, for example, the engine 102, the ignition system 106, and/or various accessories or systems (not illustrated). Such connections may allow for the communication of information, data, and/or commands between the engine control unit 104 and components of the vehicle system 100 that are used in connection with the operation and performance of the vehicle system 100.

The first ignition device 120 and the second ignition device 126 can each include one of a spark plug, a diesel pilot ignition device, a plasma ignition device, a laser ignition device, a thermal ignition device, a non-thermal ignition device, or other types of ignition devices.

Figure 2:
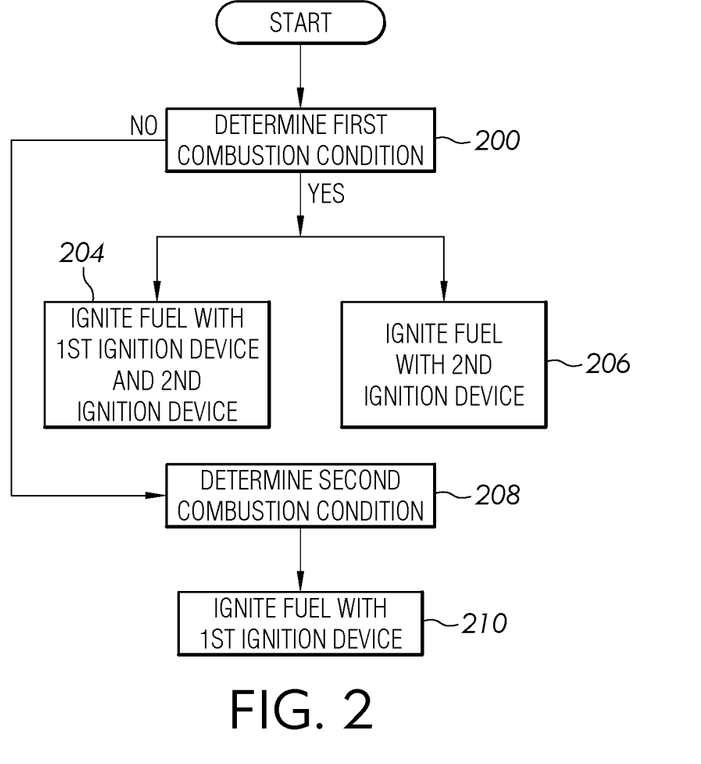
FIG. 2 is a block diagram of a procedure for igniting fuel with first and/or second ignition devices of the vehicle system of FIG. 1.

FIG. 2 is a block diagram of a procedure for igniting fuel with the first ignition device 122 and/or the second ignition device 126 of the vehicle system 100. In block 200, the engine control unit 104 determines a first combustion condition. In block 204, the engine control unit 104 operates the first ignition device 122 to ignite the fuel in the pre-combustion chamber 122 and operates the second ignition device 126 to ignite the fuel in the main combustion chamber 128. Alternatively, in block 206, the engine control unit 104 operates the second ignition device 126 to ignite the fuel in the main combustion chamber 128 wherein the first ignition device 122 is not operated. In block 208, if the first combustion condition is not satisfied, then engine control unit 104 determines a second combustion condition. In block 210, the engine control unit 104 operates only the first ignition device 122 to ignite the fuel in the pre-combustion chamber 122.

Figure 3:
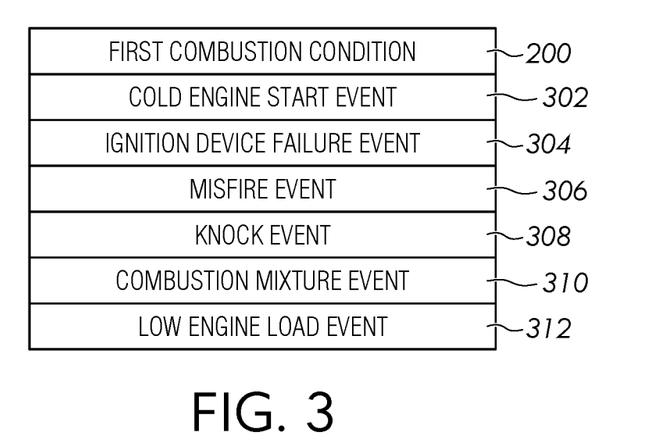
FIG. 3 is a table including a plurality of first combustion conditions.

FIG. 3 illustrates the first combustion conditions 200 that include a cold engine start event 302, an ignition device failure event 304, a misfire event 306, a knock event 308, an inadequate combustion mixture event 310, and a low engine load event 312. Engine control unit 104 and ignition system 106 are structured to detect the first combustion conditions 200.

Figure 4:
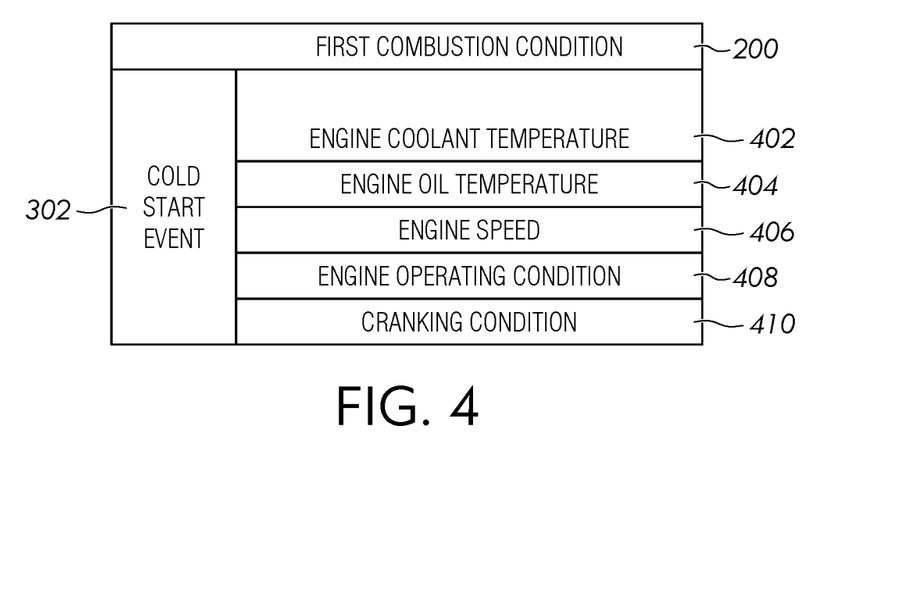
FIG. 4 is a table including a plurality of cold start event conditions for the first combustion condition.

The cold start event 302 shall now be further described as illustrated in FIG. 4. Cold start events 302 include parameters such as an engine coolant temperature 402, an engine oil temperature 404, an engine speed 406, an engine operating condition 408, and a cranking condition 410. Cold start events 302 can be determined in a variety of ways, and different criteria can be employed to make such a determination.

Engine oil temperature 404 can be employed to determine cold start event 302. When the engine oil temperature 404 is below an engine oil temperature threshold then cold start event 302 is present. The viscosity of engine oil increases as its temperature decreases. During cold start conditions due to engine oil viscosity it takes significantly more battery power to crank the engine and as a result the crank speed decreases as engine oil temperature decreases.

Additional temperatures can be employed to determine cold start event 302. For example, engine coolant temperature 402 can be an indication of whether the engine has been recently running, thereby providing an indirect measure of engine oil temperature. When engine coolant temperature 402 is below an engine coolant temperature threshold then cold start event 302 exists. Generally speaking, engine oil temperature 404 mostly varies with engine output, whereas engine coolant temperature 402 varies with engine output, airflow and radiator capacity. As a result, engine oil temperature 404 is largely unrelated to engine coolant temperature 402, except that when the oil temperature 404 is warm it is likely that the coolant temperature 402 is warm.

Alternatively, or additionally, engine speed 406 can be employed to determine cold start event 302. Cold start event 302 also includes the engine speed 406 being less than an engine speed threshold, in which case controller temperature will be lower than ambient air temperature.

Alternatively, or additionally, engine operating condition 408 can be employed to determine cold start event 302. The engine operating condition 408 includes the engine being in an off or non-operating condition.

Alternatively, or additionally, cranking condition 410 can be employed to determine cold start event 302. Cranking condition 410 includes a crankshaft speed being less than a threshold speed. A low battery voltage can contribute to the cranking condition 410 including the crankshaft speed being less than a threshold speed.

Figure 5:
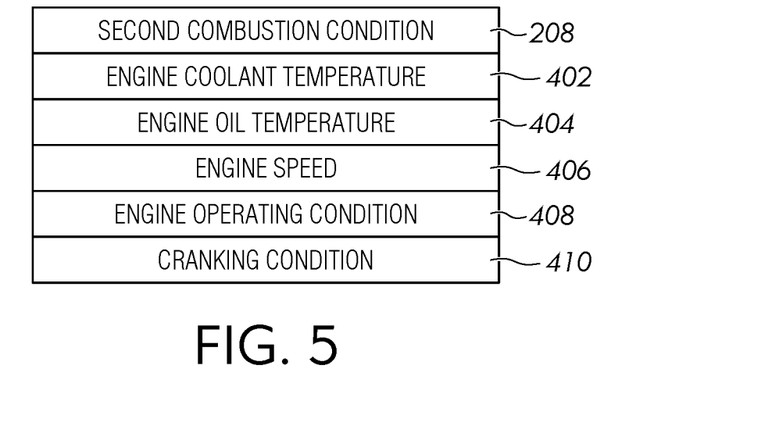
FIG. 5 is a table including a plurality of second combustion conditions.

FIG. 5 illustrates the second combustion conditions 208 that include the conditions from the first combustion condition 200 compared to respective thresholds. Engine control unit 104 and the ignition system 106 are structured to detect the second combustion conditions 208 which shall now be further described. The second combustion conditions 208 include one or more parameters such as the engine coolant temperature 402, the engine oil temperature 404, the engine speed 406, the engine operating condition 408, and the cranking condition 410. The engine coolant temperature 402 being greater than the engine coolant temperature threshold, the engine oil temperature 404 being greater than the engine oil temperature threshold, the engine speed 406 being greater than the engine speed threshold, the engine operating condition 408 being in an operating or running condition of the engine 102, and the cranking condition 410 includes the crankshaft speed being above the threshold speed. In response to the second combustion condition 208, the engine control unit 104 operates only the first ignition device 122 to ignite the fuel in the pre-combustion chamber 122.

As mentioned previously, the first combustion condition 200 may also include the ignition device failure event 304. The ignition device failure event 304 includes the first ignition device 120 failing to ignite the fuel in the pre-combustion chamber 122 of the cylinder 124.

As mentioned previously, the first combustion condition 200 may also include the misfire event 306. The misfire event 306 includes either the first ignition device 120 or the second ignition device 126 not firing properly during an operating condition of the engine 102. In one form, the engine control unit 104 can disable the ignition system 106 for one combustion cycle associated with the cylinder 124 and after the one combustion cycle is complete, re-enabling the ignition system 106 to ignite fuel with both or one of the first ignition device 120 and the second ignition device 126 to operate the engine 102.

The first combustion condition 200 may also include the knock event 308. The presence of knock generated during operation of the engine 102 can be attributed, at least in part, to in-cylinder temperatures and the properties of the fuel that is used. In-cylinder temperatures during combustion events can also generally be correlated to the presence, and potential increases, of the quantity of nitrogen oxides ($NO_x$). Moreover, as in-cylinder temperatures increase, both the instances of engine knock and the quantity of generated $NO_x$ can also increase.

The first combustion condition 200 may also include the inadequate combustion mixture event 310. The inadequate combustion mixture event 310 is a lean combustion mixture event determined in response to at least one of an air-fuel ratio of the combustion mixture, a lambda sensor output, and an engine out $NO_x$ sensor output.

The first combustion condition 200 may also include the low engine load event 312. The engine load event 312 includes one or more of an engine load being less than an engine load threshold, an intake manifold pressure being less than an intake manifold pressure threshold, and a cylinder pressure being less than a cylinder pressure threshold.

The engine control unit 104 is operable with the ignition system 106 to determine an ionization condition in the main combustion chamber 128. In particular, the second ignition device 126 may operate as an ion sensor to determine an ionization condition in the main combustion chamber 128. As such, the second ignition device 126 detects the quality of the combustion of fuel, start of combustion of fuel, and peak pressure location in the main combustion chamber 128.

Various aspects of the present disclosure are contemplated. According to one aspect, a method includes determining a first combustion condition of an internal combustion engine, an ignition system including a first ignition device for igniting fuel in a pre-combustion chamber of a cylinder and a second ignition device for igniting fuel in a main combustion chamber of the cylinder, and an engine control unit configured to initiate ignition with the first ignition device independently of the second ignition device; and in response to the first combustion condition, (i) igniting fuel with the first ignition device and the second ignition device or (ii) igniting fuel with the second ignition device without igniting fuel with the first ignition device, to operate the engine.

In one embodiment, the method includes determining an occurrence of a second combustion condition associated with operation of the internal combustion engine; and in response to the second combustion condition, igniting fuel with only the first ignition device to operate the engine. In a refinement thereof, the first combustion condition includes at least one of a cold engine start event, an ignition device failure event, a misfire event, a knock event, an inadequate combustion mixture event, and a low engine load event. In a further refinement thereof, the first combustion condition includes a cold engine start event, wherein the cold start event is determined in response to one or more of an engine coolant temperature being less than an engine coolant temperature threshold, an engine oil temperature being less than an engine oil temperature threshold, an engine speed being less than an engine speed threshold, a running state of the internal combustion engine being off, and a cranking condition of the internal combustion engine indicating a crankshaft speed less than a threshold speed. In yet a further refinement, the second combustion condition includes one or more at least one of the engine coolant temperature being greater than the engine coolant temperature threshold, the engine oil temperature being greater than the engine oil temperature threshold, the engine speed being greater than the engine speed threshold, the engine being in a running state, and the cranking condition indicating the crankshaft speed being above the threshold speed.

In one embodiment, the first combustion condition is the ignition device failure event, and the ignition device failure event includes the first ignition device failing to ignite the fuel in the pre-combustion chamber. In a refinement thereof, the first combustion condition is the misfire event. In a further refinement thereof, the first combustion condition is the inadequate combustion mixture event, and the inadequate combustion mixture event is a lean combustion mixture event determined in response to at least one of an air-fuel ratio of the combustion mixture, a lambda sensor output, and an engine out $NO_x$ sensor output. In a refinement thereof, upon detection of the misfire event, disabling the ignition system for one combustion cycle associated with the cylinder; and after the one combustion cycle is complete, re-enabling the ignition system to ignite fuel with both the first ignition device and the second ignition device to operate the engine.

In one embodiment, further comprising determining an ionization condition in the main combustion chamber with the second ignition device.

In one embodiment, the first ignition device and the second ignition device include one of a spark plug, a diesel pilot ignition device, a plasma ignition device, a laser ignition device, a thermal ignition device, or a non-thermal ignition device.

In another aspect, a system includes an internal combustion engine; an ignition system including a first ignition device associated with a pre-combustion chamber of a cylinder and a second ignition device associated with a main combustion chamber of the cylinder; an engine control unit operably connected to both of the internal combustion engine and the ignition system, the engine control unit configured to ignite fuel for the cylinder with the first ignition device independently of igniting fuel with the second ignition device; wherein the engine control unit is configured to determine an occurrence of at least one combustion condition associated with an operating condition of the engine, the engine control unit further configured, in response to the occurrence of the at least one combustion condition, to (i) ignite fuel for combustion with both of the first ignition device and the second ignition device or (ii) ignite fuel for combustion only with the second ignition device, to operate the engine.

In one embodiment, the system includes the engine control unit configured to determine an occurrence of at least one second combustion condition associated with operation of the engine; and wherein the engine control unit is further configured, in response to the second combustion condition, to ignite fuel only with the first ignition device to operate the engine.

In one embodiment, the at least one combustion condition includes one or more of a cold engine start event, an ignition device failure event, a misfire event, a knock event, an inadequate combustion mixture event, and an engine load event. In a refinement, the at least one combustion condition is the cold engine start event, and the cold engine start event is determined in response to one or more of an engine coolant temperature being less than an engine coolant temperature threshold, an engine oil temperature being less than an engine oil temperature threshold, an engine speed being less than an engine speed threshold, a running state of the internal combustion engine being off, and the cranking condition indicating the crankshaft speed being below a threshold speed.

In one embodiment, the second combustion condition includes one or more of the engine coolant temperature being greater than the engine coolant temperature threshold, the engine oil temperature being greater than the engine oil temperature threshold, the engine speed being greater than the engine speed threshold, the running state of the internal combustion engine being on, and the cranking condition indicating the crankshaft speed being above the threshold speed.

In one embodiment, the first combustion condition is the ignition device failure event, and the ignition device failure event is the failure of the first ignition device to ignite the fuel in the pre-combustion chamber.

In one embodiment, the first combustion event is the misfire event, and the engine control unit is configured to detect the misfire event and disable the ignition system for one combustion cycle associated with the cylinder; and after the one combustion cycle is complete, the engine control unit is configured to re-enable the ignition system to ignite fuel with both the first ignition device and the second ignition device to operate the engine.

In one embodiment, the first combustion event is the inadequate combustion mixture event, and the inadequate combustion mixture event is a lean combustion mixture determined in response to at least one of an air-fuel ratio, a lambda sensor output, and $NO_x$ sensor output.

In one embodiment, the engine control unit is configured to disable the ignition system in response to the misfire event and the engine control unit is configured to enable the ignition system to ignite fuel with both the first ignition device and the second ignition device in response to determining the misfire event is over.

In one embodiment, the engine load event includes an engine load being less than an engine load threshold, an intake manifold pressure being less than an intake manifold pressure threshold, and a cylinder pressure being less than a cylinder pressure threshold.

In one embodiment, the second ignition device is further configured to sense an ionization condition in the combustion chamber.

In one embodiment, the first ignition device and the second ignition device include one of a spark plug, a diesel pilot ignition device, a plasma ignition device, a laser ignition device, a thermal ignition device, or a non-thermal ignition device.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A method comprising:
   determining a first combustion condition that includes at least a misfire event of an internal combustion engine including an ignition system including a first ignition device for igniting fuel in a pre-combustion chamber of a cylinder and a second ignition device for igniting fuel in a main combustion chamber of the cylinder, and an engine control unit configured to initiate ignition with the first ignition device independently of the second ignition device;
   in response to the first combustion condition, (i) igniting fuel with the first ignition device and the second ignition device or (ii) igniting fuel with the second ignition device without igniting fuel with the first ignition device, to operate the engine;
   wherein upon detection of the misfire event, disabling the ignition system for one combustion cycle associated with the cylinder; and
   after the combustion cycle is complete, re-enabling the ignition system to ignite fuel with both the first ignition device and the second ignition device to operate the engine.

2. The method of claim 1, further comprising:
   determining an occurrence of a second combustion condition associated with operation of the internal combustion engine; and
   in response to the second combustion condition, igniting fuel with only the first ignition device to operate the engine.

3. The method of claim 2, wherein the first combustion condition includes at least one of a cold engine start event, an ignition device failure event, a knock event, an inadequate combustion mixture event, and a low engine load event.

4. The method of claim 3, wherein the first combustion condition includes a cold engine start event, wherein the cold start event is determined in response to one or more of an engine coolant temperature being less than an engine coolant temperature threshold, an engine oil temperature being less than an engine oil temperature threshold, an engine speed being less than an engine speed threshold, the internal combustion engine being in a nonoperating condition, and a cranking condition of the internal combustion engine indicating a crankshaft speed less than a threshold speed.

5. The method of claim 4, wherein the second combustion condition includes one or more of at least one of the engine coolant temperature being greater than the engine coolant temperature threshold, the engine oil temperature being greater than the engine oil temperature threshold, the engine speed being greater than the engine speed threshold, the internal combustion engine being in an operating condition, and the cranking condition indicating the crankshaft speed being above the threshold speed.

6. The method of claim 3, wherein the first combustion condition is the ignition device failure event, and the ignition device failure event includes the first ignition device failing to ignite the fuel in the pre-combustion chamber.

7. The method of claim 3, wherein the first combustion condition is the inadequate combustion mixture event, and the inadequate combustion mixture event is a lean combustion mixture event determined in response to at least one of an air-fuel ratio of the combustion mixture, a lambda sensor output, and an engine out NOx sensor output.

8. The method of claim 1, further comprising:
   determining an ionization condition in the main combustion chamber with the second ignition device.

9. The method of claim 1, wherein the first ignition device and the second ignition device include one of a spark plug, a diesel pilot ignition device, a plasma ignition device, a laser ignition device, a thermal ignition device, or a non-thermal ignition device.

10. A system, comprising:
    an internal combustion engine;
    an ignition system including a first ignition device associated with a pre-combustion chamber of a cylinder and a second ignition device associated with a main combustion chamber of the cylinder;
    an engine control unit operably connected to both of the internal combustion engine and the ignition system, the engine control unit configured to ignite fuel for the cylinder with the first ignition device independently of igniting fuel with the second ignition device;
    wherein the engine control unit is configured to determine an occurrence of at least one combustion condition that includes a misfire event associated with an operating condition of the engine, the engine control unit further configured, in response to the occurrence of the at least one combustion condition, to (i) ignite fuel for combustion with both of the first ignition device and the second ignition device or (ii) ignite fuel for combustion only with the second ignition device, to operate the engine; and
    wherein the engine control unit is configured to disable the ignition system in response to the misfire event and the engine control unit is configured to enable the ignition system to ignite fuel with both the first ignition device and the second ignition device in response to determining the misfire event is over.

11. The system of claim 10, further comprising:
    wherein the engine control unit is configured to determine an occurrence of at least one second combustion condition associated with operation of the engine; and
    wherein the engine control unit is further configured, in response to the second combustion condition, to ignite fuel only with the first ignition device to operate the engine.

12. The system of claim 10, wherein the at least one combustion condition includes one or more of a cold engine start event, an ignition device failure event, a knock event, an inadequate combustion mixture event, and an engine load event.

13. The system of claim 12, wherein the at least one combustion condition is the cold engine start event, and the cold engine start event is determined in response to one or more of an engine coolant temperature being less than an engine coolant temperature threshold, an engine oil temperature being less than an engine oil temperature threshold, an engine speed being less than an engine speed threshold, the internal combustion engine being in a nonoperating condition, and the cranking condition indicating the crankshaft speed being below a threshold speed.

14. The system of claim 10, wherein the second combustion condition includes one or more of the engine coolant temperature being greater than the engine coolant temperature threshold, the engine oil temperature being greater than the engine oil temperature threshold, the engine speed being greater than the engine speed threshold, the internal combustion engine being in an operating condition, and the cranking condition indicating the crankshaft speed being above the threshold speed.

15. The system of claim 12, wherein the first combustion condition is the ignition device failure event, and the ignition device failure event is the failure of the first ignition device to ignite the fuel in the pre-combustion chamber.

16. The system of claim 12, wherein the first combustion event is the misfire event, and the engine control unit is configured to detect the misfire event and disable the ignition system for one combustion cycle associated with the cylinder; and after the one combustion cycle is complete, the engine control unit is configured to re-enable the ignition system to ignite fuel with both the first ignition device and the second ignition device to operate the engine.

17. The system of claim 12, wherein the engine load event includes an engine load being less than an engine load threshold, an intake manifold pressure being less than an intake manifold pressure threshold, and a cylinder pressure being less than a cylinder pressure threshold.

18. The system of claim 10, wherein the second ignition device is further configured to sense an ionization condition in the combustion chamber.

19. The system of claim 10, wherein the first ignition device and the second ignition device include one of a spark plug, a diesel pilot ignition device, a plasma ignition device, a laser ignition device, a thermal ignition device, or a non-thermal ignition device.

20. A system, comprising:
an internal combustion engine;
an ignition system including a first ignition device associated with a pre-combustion chamber of a cylinder and a second ignition device associated with a main combustion chamber of the cylinder;
an engine control unit operably connected to both of the internal combustion engine and the ignition system, the engine control unit configured to ignite fuel for the cylinder with the first ignition device independently of igniting fuel with the second ignition device;
wherein the engine control unit is configured to determine an occurrence of at least one combustion condition that includes a misfire event associated with an operating condition of the engine, the engine control unit further configured, in response to the occurrence of the at least one combustion condition, to (i) ignite fuel for combustion with both of the first ignition device and the second ignition device or (ii) ignite fuel for combustion only with the second ignition device, to operate the engine; wherein the first combustion event is an inadequate combustion mixture event, and the inadequate combustion mixture event is a lean combustion mixture determined in response to at least one of an air-fuel ratio, a lambda sensor output, and NOx sensor output.

* * * * *